United States Patent
Gan et al.

(10) Patent No.: US 12,050,933 B2
(45) Date of Patent: Jul. 30, 2024

(54) DYNAMIC PROFILING OF STORAGE CLASS MEMORY (SCM) BASED ON MONITORED SCM UTILIZATION AND PREDICTED FUTURE SCM UTILIZATION

(71) Applicant: Kyndryl, Inc., New York, NY (US)

(72) Inventors: Seng Chai Gan, Ashburn, VA (US); Shikhar Kwatra, San Jose, CA (US); Iranna Dharmaraya Ankad, Bengaluru (IN); Anil Bindu Lingambudi, Bengaluru (IN); Komminist Weldemariam, Ottawa (CA)

(73) Assignee: Kyndryl, Inc., New York, NY (US)

( * ) Notice: Subject to any disclaimer, the term of this patent is extended or adjusted under 35 U.S.C. 154(b) by 455 days.

(21) Appl. No.: 17/305,849

(22) Filed: Jul. 15, 2021

(65) Prior Publication Data
US 2023/0017844 A1  Jan. 19, 2023

(51) Int. Cl.
*G06F 9/50* (2006.01)
*G06F 3/06* (2006.01)

(52) U.S. Cl.
CPC .......... *G06F 9/5016* (2013.01); *G06F 3/0604* (2013.01); *G06F 3/0631* (2013.01);
(Continued)

(58) Field of Classification Search
CPC .... G06F 9/5016; G06F 3/0604; G06F 3/0631; G06F 3/0644; G06F 3/067; G06F 9/505; G06F 9/5083
See application file for complete search history.

(56) References Cited

U.S. PATENT DOCUMENTS 9,430,337 B1   8/2016  Gupta
10,929,290 B2  2/2021  Nachimuthu et al.
(Continued)

OTHER PUBLICATIONS

Shirota et al., "Hybrid Access in Storage-Class Memory-Aware Low Power Virtual Memory System," 2019 IEEE Symposium in Low-Power and High-Speed Chips (IEEE Cool Chips 22), 2019, 3 pages.

*Primary Examiner* — Meng Ai T An
*Assistant Examiner* — Hsing Chun Lin
(74) *Attorney, Agent, or Firm* — VanLeeuwen & VanLeeuwen; Daniel C. Housley

(57) ABSTRACT

Configuration and dynamic profiling of storage class memory (SCM) devices is provided. Information is retrieved that includes historical SCM device configurations, historical SCM device utilization, functional and non-functional properties of a plurality of SCM devices on a host node, current real time utilization of the plurality of SCM devices by an application workload of a customer running on the host node, and relationships between the plurality of SCM devices, needs of the customer, and resource capabilities and real time resource utilization on the host node. A configuration of each respective SCM device is determined based on retrieved information and an artificial intelligence-predicted SCM device future utilization trajectory of the customer. Each respective SCM device is dynamically configured with a set of SCM device partitions according to a corresponding SCM device profile based on the determined configuration of each respective SCM device of the plurality of SCM devices.

13 Claims, 9 Drawing Sheets

(52) U.S. Cl.
CPC .......... *G06F 3/0644* (2013.01); *G06F 3/067* (2013.01); *G06F 9/505* (2013.01); *G06F 9/5083* (2013.01)

(56) References Cited

U.S. PATENT DOCUMENTS

| | | | |
|---|---|---|---|
| 11,314,635 B1* | 4/2022 | Volpe | G06F 11/1004 |
| 2014/0082317 A1 | 3/2014 | Brooker et al. | |
| 2016/0259563 A1 | 9/2016 | Driever et al. | |
| 2016/0378601 A1* | 12/2016 | Oukid | G06F 3/0644 714/3 |
| 2018/0314441 A1* | 11/2018 | Suryanarayana | G06F 3/0683 |
| 2020/0142753 A1 | 5/2020 | Harwood et al. | |
| 2022/0060472 A1* | 2/2022 | Chhabra | G06F 12/1483 |
| 2022/0214965 A1* | 7/2022 | Prasad | G06N 20/00 |

\* cited by examiner

| SCM DEVICE PROFILE TABLE 300 | 0 | 1 | 2 | 3 |
|---|---|---|---|---|
| PROFILE A | SCM ONLY | SCM ONLY | SCM ONLY | SCM ONLY |
| PROFILE B | SCM + DRaaS | SCM + DRaaS | SCM + DRaaS | SCM + DRaaS |
| PROFILE C | SCM + NAS | SCM + NAS | SCM + NAS | SCM + NAS |
| PROFILE D | SCM + DRaaS + NAS | SCM + DRaaS + NAS | SCM + DRaaS + NAS | SCM + DRaaS + NAS |

SCM DEVICE IDENTIFIERS 302

SCM DEVICE PROFILES 304

FIG. 3

DYNAMIC PROFILING OF STORAGE CLASS MEMORY (SCM) BASED ON MONITORED SCM UTILIZATION AND PREDICTED FUTURE SCM UTILIZATION

BACKGROUND

1. Field

The disclosure relates generally to storage class memory and more specifically to dynamically configuring each of a plurality of storage class memory devices on a host node with a set of storage type partitions according to one of a plurality of storage class memory device profiles based on monitored utilization of each respective storage class memory device by an application workload of a customer running on the host node and predicted future storage class memory device utilization trajectory of the customer.

2. Description of the Related Art

Storage Class Memory (SCM) is a hybrid memory technology that occupies an intermediate space between dynamic random-access memory (DRAM) and traditional storage, such as, for example, solid state drives, hard disk drives, and the like, in a server architecture. SCM treats non-volatile memory as DRAM and the SCM is included in the memory space of the server architecture. Access to data in that memory space is significantly faster than access to data in local, peripheral component interconnect-connected solid state drives, direct-attached hard disk drives, or external storage arrays.

SUMMARY

According to one illustrative embodiment, a computer-implemented method for configuring storage class memory (SCM) devices is provided. A computer retrieves information that includes historical SCM device configurations, historical SCM device utilization, functional and non-functional properties of a plurality of SCM devices on a host node, current real time utilization of the plurality of SCM devices by an application workload of a customer running on the host node, and relationships between the plurality of SCM devices, needs of the customer, resource capabilities of the host node, and real time resource utilization on the host node. The computer determines a configuration of each respective SCM device of the plurality of SCM devices based on retrieved information and an artificial intelligence-predicted SCM device future utilization trajectory of the customer. The computer dynamically configures each respective SCM device of the plurality of SCM devices with a set of SCM device partitions according to a corresponding SCM device profile based on the determined configuration of each respective SCM device of the plurality of SCM devices. According to other illustrative embodiments, a computer system and computer program product for configuring SCM devices are provided.

BRIEF DESCRIPTION OF THE DRAWINGS

FIG. 3 is a diagram illustrating an example of an SCM device profile table in accordance with an illustrative embodiment.

DETAILED DESCRIPTION

Figure 1:
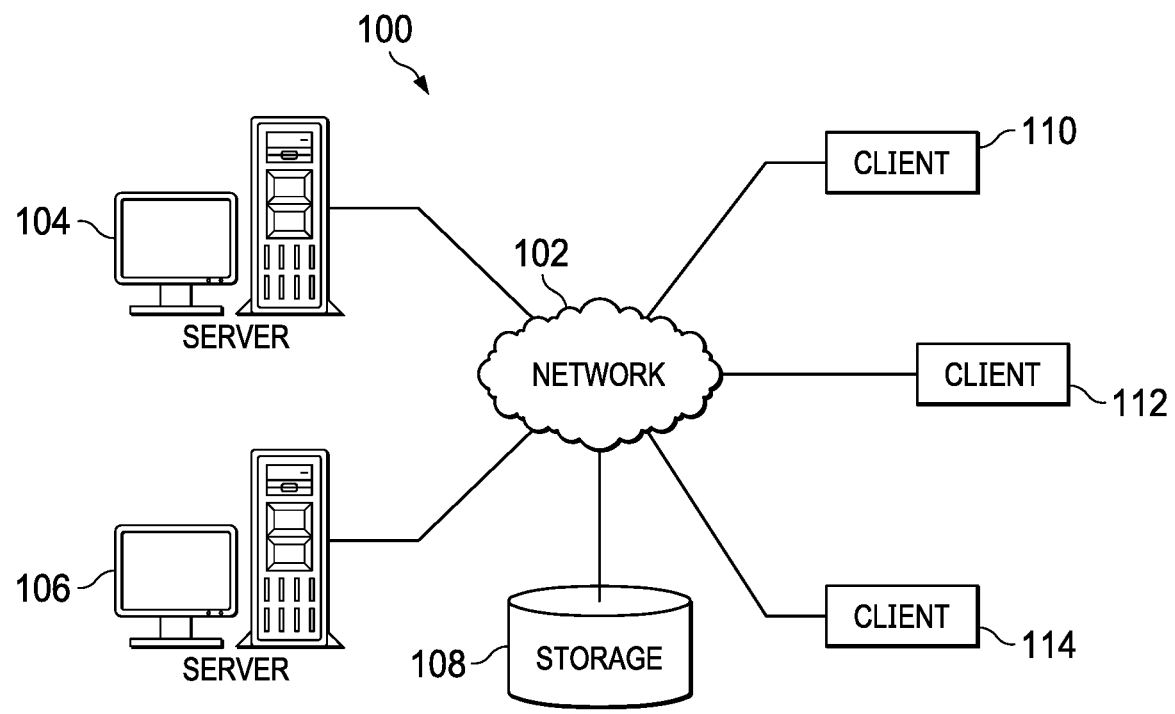
FIG. 1 is a pictorial representation of a network of data processing systems in which illustrative embodiments may be implemented.

The present invention may be a system, a method, and/or a computer program product at any possible technical detail level of integration. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
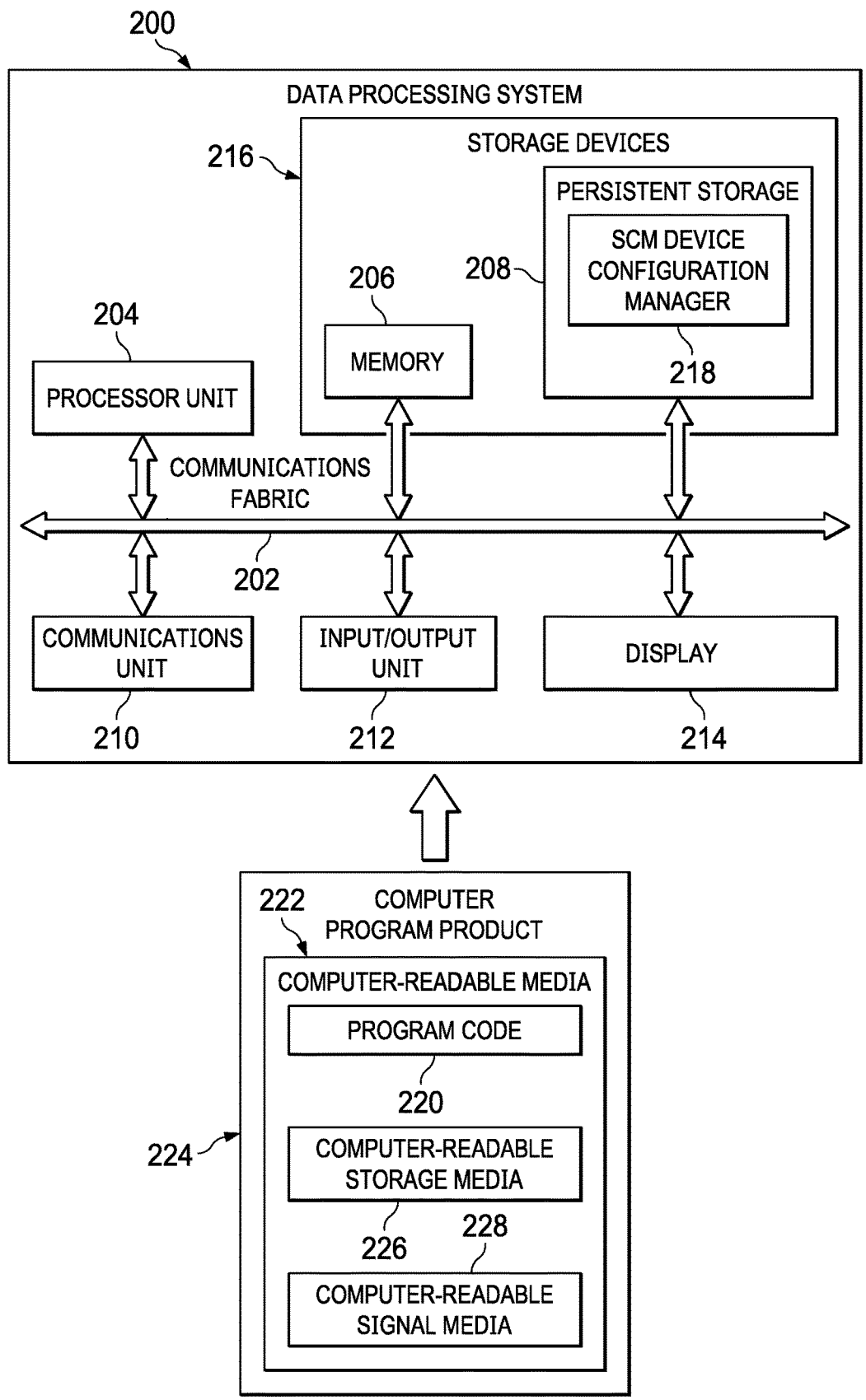
FIG. 2 is a diagram of a data processing system in which illustrative embodiments may be implemented.

With reference now to the figures, and in particular, with reference to FIG. 1 and FIG. 2, diagrams of data processing environments are provided in which illustrative embodiments may be implemented. It should be appreciated that FIG. 1 and FIG. 2 are only meant as examples and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers, data processing systems, and other devices in which the illustrative embodiments may be implemented. Network data processing system 100 contains network 102, which is the medium used to provide communications links between the computers, data processing systems, and other devices connected together within network data processing system 100. Network 102 may include connections, such as, for example, wire communication links, wireless communication links, fiber optic cables, and the like.

In the depicted example, server 104 and server 106 connect to network 102, along with storage 108. Server 104 and server 106 may be, for example, server computers with high-speed connections to network 102. Alternatively, server 104 and server 106 may be hardware management consoles. Also, server 104 and server 106 may each represent a cluster of servers in one or more data centers. Alternatively, server 104 and server 106 may each represent multiple computing nodes in one or more cloud environments.

In addition, server 104 and server 106 may provide storage class memory (SCM) device configuration management services to client devices. Server 104 and server 106 provide the SCM device configuration management services by dynamically configuring each of a plurality of SCM devices (e.g., 4 SCM devices) on a client host node with a set of storage type partitions according to one of a plurality of SCM device profiles based on continuously monitoring utilization of each respective SCM device by an application workload of a customer running on a host node and periodically receiving predicted future storage class memory device utilization trajectory of the customer from a set of artificial intelligence models. It should be noted that 4 SCM devices on a host node is intended as an example only and not as a limitation on illustrative embodiments. In other words, a host node may include any number of SCM devices. The set of storage type partitions on a given SCM device includes at least one of an SCM partition, a disaster recovery as a service (DRaaS) partition, a network attached storage (NAS) partition, or the like.

Disaster recovery involves a set of policies, tools, and procedures that enable recovery or continuation of information technology infrastructure and systems following a natural or human-induced disaster. DRaaS is a service offered either on-premises or at cloud level. Characteristics of DRaaS include an ability to automatically backup critical data and systems and an ability to recover from a disaster in the quickest time possible with minimal user intervention.

NAS is a file-level data storage server, which is connected to a local network so that the NAS can be accessed remotely either through connected computers or wireless devices. NAS services can include, for example, file or multimedia sharing, data backup and recovery, network printing, and the like.

Client 110, client 112, and client 114 also connect to network 102. Clients 110, 112, and 114 are client host nodes of server 104 and server 106. Clients 110, 112, and 114 are network computers with wire communication links to network 102. In addition, clients 110, 112, and 114 run a number of application workloads for customers of an entity, such as, for example, an enterprise, company, business, organization, institution, agency, or the like, which corresponds to clients 110, 112, and 114. The application workloads may be any type of application workloads, such as, for example, data processing, transaction processing, and the like. Further, each of clients 110, 112, and 114 includes a plurality of SCM devices, each SCM device utilizes a set of storage type partitions to store data of an application workload running on a corresponding client host node.

Storage 108 is a network storage device capable of storing any type of data in a structured format or an unstructured format. In addition, storage 108 may represent a plurality of network storage devices. Further, storage 108 may store identifiers and network addresses for a plurality of client host nodes, identifiers for a plurality of SCM devices included in client host nodes, a plurality of SCM device profiles, historical SCM device configurations, historical SCM device utilization patterns by customers, functional and non-functional properties of SCM devices, graphs indicating relationships between SCM devices, customer needs, resource capabilities and real time resource utilization on the host node, and the like. Furthermore, storage 108 may store other types of data, such as authentication or credential data that may include usernames, passwords, and the like associated with system administrators and users, for example.

In addition, it should be noted that network data processing system 100 may include any number of additional servers, clients, storage devices, and other devices not shown. Program code located in network data processing system 100 may be stored on a computer-readable storage medium or a set of computer-readable storage media and downloaded to a computer or other data processing device for use. For example, program code may be stored on a computer-readable storage medium on server 104 and downloaded to client 110 over network 102 for use on client 110.

In the depicted example, network data processing system 100 may be implemented as a number of different types of communication networks, such as, for example, an internet, an intranet, a wide area network, a local area network, a telecommunications network, or any combination thereof. FIG. 1 is intended as an example only, and not as an architectural limitation for the different illustrative embodiments.

As used herein, when used with reference to items, "a number of" means one or more of the items. For example, "a number of different types of communication networks" is one or more different types of communication networks. Similarly, "a set of," when used with reference to items, means one or more of the items.

Further, the term "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, without limitation, "at least one of item A, item B, or item C" may include item A, item A and item B, or item B. This example may also include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

With reference now to FIG. 2, a diagram of a data processing system is depicted in accordance with an illustrative embodiment. Data processing system 200 is an example of a computer or hardware management console, such as server 104 in FIG. 1, in which computer-readable program code or instructions implementing SCM device configuration management processes of illustrative embodiments may be located. In this example, data processing system 200 includes communications fabric 202, which provides communications between processor unit 204, memory 206, persistent storage 208, communications unit 210, input/output (I/O) unit 212, and display 214.

Processor unit 204 serves to execute instructions for software applications and programs that may be loaded into memory 206. Processor unit 204 may be a set of one or more hardware processor devices or may be a multi-core processor, depending on the particular implementation.

Memory 206 and persistent storage 208 are examples of storage devices 216. As used herein, a computer-readable storage device or a computer-readable storage medium is any piece of hardware that is capable of storing information, such as, for example, without limitation, data, computer-readable program code in functional form, and/or other suitable information either on a transient basis or a persistent basis. Further, a computer-readable storage device or a computer-readable storage medium excludes a propagation medium, such as transitory signals. Furthermore, a computer-readable storage device or a computer-readable storage medium may represent a set of computer-readable storage devices or a set of computer-readable storage media. Memory 206, in these examples, may be, for example, a random-access memory (RAM), or any other suitable volatile or non-volatile storage device, such as a flash memory. Persistent storage 208 may take various forms, depending on the particular implementation. For example, persistent storage 208 may contain one or more devices. For example, persistent storage 208 may be a disk drive, a solid-state drive, a rewritable optical disk, a rewritable magnetic tape, or some combination of the above. The media used by persistent storage 208 may be removable. For example, a removable hard drive may be used for persistent storage 208.

In this example, persistent storage 208 stores SCM device configuration manager 218. However, it should be noted that even though SCM device configuration manager 218 is illustrated as residing in persistent storage 208, in an alternative illustrative embodiment, SCM device configuration manager 218 may be a separate component of data processing system 200. For example, SCM device configuration manager 218 may be a hardware component coupled to communication fabric 202 or a combination of hardware and software components. In another alternative illustrative embodiment, a first set of components of SCM device configuration manager 218 may be located in data processing system 200 and a second set of components of SCM device configuration manager 218 may be located in a second data processing system, such as, for example, server 106 in FIG. 1.

SCM device configuration manager 218 controls the process of dynamically configuring SCM devices located on client host nodes, such as, for example, clients 110, 112, and 114 in FIG. 1, with storage type partitions according to SCM device profiles based on monitoring utilization of each SCM device by an application workload of a customer running on a given client host node, periodically receiving predicted future storage class memory device utilization trajectory of customers from a set of artificial intelligence models, and optionally receiving customer input in real time via XML or JSON documents to change SCM device profile configurations based on current customer needs. As a result, data processing system 200 operates as a special purpose computer system in which SCM device configuration manager 218 in data processing system 200 enables dynamic configuration of SCM devices. In particular, SCM device configuration manager 218 transforms data processing system 200 into a special purpose computer system as compared to currently available general computer systems that do not have SCM device configuration manager 218.

Communications unit 210, in this example, provides for communication with other computers, data processing systems, and devices via a network, such as network 102 in FIG. 1. Communications unit 210 may provide communications through the use of both physical and wireless communications links. The physical communications link may utilize, for example, a wire, cable, universal serial bus, or any other physical technology to establish a physical communications link for data processing system 200. The wireless communications link may utilize, for example, shortwave, high frequency, ultrahigh frequency, microwave, wireless fidelity (Wi-Fi), Bluetooth® technology, global system for mobile communications (GSM), code division multiple access (CDMA), second-generation (2G), third-generation (3G), fourth-generation (4G), 4G Long Term Evolution (LTE), LTE Advanced, fifth-generation (5G), or any other wireless communication technology or standard to establish a wireless communications link for data processing system 200.

Input/output unit 212 allows for the input and output of data with other devices that may be connected to data processing system 200. For example, input/output unit 212 may provide a connection for user input through a keypad, a keyboard, a mouse, a microphone, and/or some other suitable input device. Display 214 provides a mechanism to display information to a user and may include touch screen capabilities to allow the user to make on-screen selections through user interfaces or input data, for example.

Instructions for the operating system, applications, and/or programs may be located in storage devices 216, which are in communication with processor unit 204 through communications fabric 202. In this illustrative example, the instructions are in a functional form on persistent storage 208. These instructions may be loaded into memory 206 for running by processor unit 204. The processes of the different embodiments may be performed by processor unit 204 using computer-implemented instructions, which may be located in a memory, such as memory 206. These program instructions are referred to as program code, computer usable program code, or computer-readable program code that may be read and run by a processor in processor unit 204. The program instructions, in the different embodiments, may be embodied on different physical computer-readable storage devices, such as memory 206 or persistent storage 208.

Program code 220 is located in a functional form on computer-readable media 222 that is selectively removable and may be loaded onto or transferred to data processing system 200 for running by processor unit 204. Program code 220 and computer-readable media 222 form computer program product 224. In one example, computer-readable media 222 may be computer-readable storage media 226 or computer-readable signal media 228.

In these illustrative examples, computer-readable storage media 226 is a physical or tangible storage device used to store program code 220 rather than a medium that propagates or transmits program code 220. Computer-readable storage media 226 may include, for example, an optical or magnetic disc that is inserted or placed into a drive or other device that is part of persistent storage 208 for transfer onto a storage device, such as a hard drive, that is part of persistent storage 208. Computer-readable storage media 226 also may take the form of a persistent storage, such as a hard drive, a thumb drive, or a flash memory that is connected to data processing system 200.

Alternatively, program code 220 may be transferred to data processing system 200 using computer-readable signal media 228. Computer-readable signal media 228 may be, for example, a propagated data signal containing program code 220. For example, computer-readable signal media 228 may be an electromagnetic signal, an optical signal, or any other suitable type of signal. These signals may be transmitted over communication links, such as wireless communication links, an optical fiber cable, a coaxial cable, a wire, or any other suitable type of communications link.

Further, as used herein, "computer-readable media 222" can be singular or plural. For example, program code 220 can be located in computer-readable media 222 in the form of a single storage device or system. In another example, program code 220 can be located in computer-readable media 222 that is distributed in multiple data processing systems. In other words, some instructions in program code 220 can be located in one data processing system while other instructions in program code 220 can be located in one or more other data processing systems. For example, a portion of program code 220 can be located in computer-readable media 222 in a server computer while another portion of program code 220 can be located in computer-readable media 222 located in a set of client computers.

The different components illustrated for data processing system 200 are not meant to provide architectural limitations to the manner in which different embodiments can be implemented. In some illustrative examples, one or more of the components may be incorporated in or otherwise form a portion of, another component. For example, memory 206, or portions thereof, may be incorporated in processor unit 204 in some illustrative examples. The different illustrative embodiments can be implemented in a data processing system including components in addition to or in place of those illustrated for data processing system 200. Other components shown in FIG. 2 can be varied from the illustrative examples shown. The different embodiments can be implemented using any hardware device or system capable of running program code 220.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system.

Today, with the emergence of SCM technologies, customers are expecting choices and flexibility in terms of SCM configurations and offerings, while leveraging enterprise class features, such as DRaaS and NAS, with increased efficiency, increased performance, and decreased cost. Illustrative embodiments dynamically configure SCM devices such that customers or system administrators will have choices and flexibility with regard to configuring and utilizing SCM, while exploiting enterprise NAS capabilities and disaster recovery solutions.

Illustrative embodiments can assist a system administrator to pre-configure respective SCM devices per one of a plurality of different SCM profile options, which illustrative embodiments can include as potential customer offerings. In other words, the customer may select one SCM device profile or a combination of SCM device profiles for configuring SCM devices. The plurality of different SCM device profile options may include, for example: 1) "Profile A" for configuring a given SCM device as SCM only; 2) "Profile B" for configuring a given SCM device as SCM and DRaaS; 3) "Profile C" for configuring a given SCM device as SCM and NAS; and 4) "Profile D" for configuring a given SCM device as SCM, DRaaS, and NAS. Further, illustrative embodiments can also dynamically generate profiles for SCM devices based on current SCM device utilization by an application workload running on the host node and inputs from a set of artificial intelligence models predicting future SCM device utilization trajectory.

Each SCM device has a storage capacity of, for example, 3 terabytes (TBs). However, it should be noted that 3 TBs is intended as an example only and that an SCM device may have any size storage capacity. Also, a host node (e.g., a network computer) can implement, for example, 4 SCM devices having a total storage capacity of 12 TBs based on the 3 TB storage capacity of each respective SCM device in the host node. A system administrator can initially configure each of the 4 SCM devices in the host node for a customer by selecting one of the SCM device profile options for a given SCM device. For example, the system administrator builds an SCM device profile for each respective SCM device using one of the SCM device profile options above.

After the system administrator builds all of the SCM device profiles, the system administrator appends a corresponding SCM device identifier and host node number to each respective SCM device profile. The SCM device profiles may be, for example, Profile A that allocates 100% of the storage capacity of a given SCM device for an SCM implementation only, Profile B that allocates X % of the storage capacity of a given SCM device for an SCM implementation and Y % for a DRaaS implementation, Profile C that allocates X % of the storage capacity of a given SCM device for an SCM implementation and Y % for an NAS implementation, and Profile D that allocates X % of the storage capacity of a given SCM device for an SCM implementation, Y % for a DRaaS implementation, and Z % for an NAS implementation.

After building all of the SCM device profiles, the system administrator builds a host node profile for each respective host node in the system by selecting a combination of SCM device profiles corresponding to the SCM devices (e.g., 4 SCM devices) included in a given host node. Further, the system administrator configures SCM devices either at a single host node level or at a rack of host nodes level based on customer needs and preferences.

Illustrative embodiments generate a storage pool for a single host node using storage controller software, which maintains a start and end address range for each respective storage type partition (SCM partition, DRaaS partition, and NAS partition) in a given SCM device of the host node. A field-programmable gate array (FPGA) controller of the host node reads the profile of the host node along with the profiles of the host node's corresponding SCM devices. Then, the FPGA controller instructs a flexible service processor (FSP) or a baseboard management controller (BMC) of the host node to handle the configuration of each respective SCM device on the host node according to a corresponding SCM device profile. For example, the FSP or BMC can configure SCM device 0 according to SCM device Profile A where 100% of the storage capacity (e.g., 3 TBs) of SCM device 0 is used for SCM only. The FSP or BMC can configure SCM device 1 according to SCM device Profile B where 50% of the storage capacity of SCM device 1 is used for SCM and 50% is used for DRaaS. The FSP or BMC can configure SCM device 2 according to SCM device Profile C where 50% of the storage capacity of SCM device 2 is used for SCM and 50% is used for NAS. The FSP or BMC can configure SCM device 3 according to SCM device Profile D where 50% of the storage capacity of SCM device 3 is used for SCM, 25% is used for DRaaS, and 25% is used for NAS.

A hypervisor can abstract and present isolated SCM device storage type partitions (i.e., SCM, DRaaS, and NAS storage type partitions of a given SCM device) directly to different virtual machines as either execution memory or a flash-type storage. Thus, at the host node level, the FSP or BMC executes processes of illustrative embodiments. In addition, the operating system and hypervisor of the host node are agnostic.

Illustrative embodiments generate a storage pool for a rack of host nodes using storage controller software, which maintains a start and end address range for each respective storage type partition (SCM partition, DRaaS partition, and NAS partition) in a particular SCM device of each respective host node in the rack of host nodes. An FPGA controller of each respective host node in the rack reads its host node profile and corresponding SCM device profiles. After reading the host node profile and the corresponding SCM device profiles, the FPGA controller of each respective host node in the rack sends the host node profile and corresponding SCM device profile information to an FSP or BMC of its host node. In turn, the FSP or BMC of each respective host node in the rack sends the host node profile and corresponding SCM device profile information to a hypervisor of its host node and then to a hardware management console (HMC) or intelligent platform management interface (IPMI) to handle the configuration of each respective SCM device on each respective host node in the rack according to corresponding SCM device profiles. The hypervisors can abstract and present isolated SCM device storage type partitions directly to different virtual machines as either execution memory or a flash-type storage resource. Thus, at the rack level, the HMC or IPMI executes processes of illustrative embodiments. In addition, the hypervisors and operating systems of host nodes are agnostic.

Illustrative embodiments continuously monitor SCM device utilization across all SCM, DRaaS, and NAS storage type partitions of each respective SCM device and determine changes to SCM device profiles based on at least one of a plurality of different inputs. The plurality of inputs may include, for example, application workload across SCM, DRaaS, and NAS storage type partitions of a respective SCM device (e.g., minimal or no utilization of a particular storage type partition in a given SCM device), artificial intelligence model (prescriptive analytics) input for dynamically adding and deleting SCM, DRaaS, and NAS storage type partitions of a given SCM device based on analysis of SCM device utilization data, customer inputs via XML, or JSON documents to change a set of SCM device profiles in real-time based on current customer needs, and the like. During an attempt to change an SCM device profile, illustrative embodiments can prompt a user, such as, for example, a customer or system administrator, for 2-factor authentication. Upon successful user 2-factor authentication, illustrative embodiments automatically perform management of the SCM storage pool by adjusting respective SCM, DRaaS, and NAS storage type partitions of one or more SCM devices. Afterward, illustrative embodiments continue to monitor SCM device utilization.

Previous solutions managed SCM partitions independently using storage controller software residing in an operating system of a host node. In these previous solutions, SCM partitions acted as either an extended DRAM space (e.g., for load/store) or flash-type storage. In contrast, illustrative embodiments manage all SCM device storage type partitions in a single storage pool using an FSP or BMC in a single host node or HMC or IPMI in a multi-node rack system. As a result, using illustrative embodiments, each respective SCM device can provide a set of functionalities (i.e., at least one of SCM, DRaaS, and NAS). Furthermore, illustrative embodiments dynamically adjust SCM device profiles by adding and deleting SCM device storage type partitions based on inputs, such as, for example, application workload running on a host node, artificial intelligence model predictions, customer-specified rules via XML/JSON documents, and the like, thereby increasing system efficiency and performance.

Illustrative embodiments utilize prescriptive analytics of artificial intelligence models on top of a time series AutoRegressive Integrated Moving Average (ARIMA) model. An ARIMA model is a class of statistical models for analyzing and forecasting time series data. The AutoRegressive (AR) parameter of the ARIMA model uses the dependent relationship between an observation and some number of lagged observations. The Integrated (I) parameter of the ARIMA model uses differencing of raw observations (e.g., subtracting an observation from an observation at a previous time step) in order to make the time series stationary. The Moving Average (MA) parameter of the ARIMA model uses the dependency between an observation and a residual error from a moving average model applied to lagged observations. Standard notations for these parameters are "p", "d", and "q", respectively, where p is the number of lag observations included in the model (also called the lag order), d is the number of times that the raw observations are differenced (also called the degree of differencing), and q is the size of the moving average window (also called the order of moving average).

Illustrative embodiments utilize prescriptive analytics by combining the ARIMA model with a Decision Optimizer (DO) component over a time windowing pattern to dynamically optimize addition and deletion of SCM device storage type partitions based on inputs to the DO component from the ARIMA model. In other words, over time at different instants, illustrative embodiments capture a data stream in order to generate a prediction. Illustrative embodiments feed SCM device profiles with compute parameters into the ARIMA model, where p is the order of the AR term, d is the number of differencing required to make the time series stationary for the I term, and q is the order of the MA term. Prediction Yt=Constant+Linear combination Lags of Y (up to p lags)+Linear Combination of Lagged forecast errors (up to q lags). Illustrative embodiments feed the output of the ARIMA model into the DO component running prescriptive analytics. Illustrative embodiments utilize an optimization software callable library along with compute constraints to optimize a constraint objective function, which provides prescription over minimum and maximum constraints for system efficiency and performance and customer satisfaction. Illustrative embodiments utilize these constraints to dynamically optimize the addition and deletion of SCM device storage type partitions.

Thus, illustrative embodiments determine optimal configurations of SCM devices in a host node based on a customer's needs and predicted SCM device utilization patterns of computing resources. Illustrative embodiments utilize information in a repository, which contains, for example, historical optimal configurations of SCM devices, functional and non-functional properties of SCM devices, and graphs that capture relationships between SCM devices, customer needs, resource capabilities of host nodes, and real time resource utilization on the host nodes, to predict optimal configurations and utilization of SCM devices in the host nodes. Functional properties of a given SCM device may include, for example, utilization of each respective storage type partition of a set of partitions (e.g., at least one of an SCM partition, a DRaaS partition, and a NAS partition) on that SCM device, customer application workload, data footprint on that SCM device, and the like. Non-functional properties of a given SCM device may include, for example, customer needs, system administrator configuration preferences, artificial intelligence configuration determinations, and the like. Furthermore, illustrative embodiments utilize artificial intelligence models to simulate configurations of SCM devices for new resource needs of a customer based on historical utilization of SCM devices by a group of customers and predicted future compute needs trajectory of the customer.

Thus, illustrative embodiments provide one or more technical solutions that overcome a technical problem with configuring SCM devices on host nodes to optimally run application workloads and increase host node performance. As a result, these one or more technical solutions provide a technical effect and practical application in the field of SCM.

With reference now to FIG. 3, a diagram illustrating an example of an SCM device profile table is depicted in accordance with an illustrative embodiment. SCM device profile table 300 may be implemented in an SCM device configuration manager, such as, for example, SCM device configuration manager 218 in FIG. 2. SCM device profile table 300 includes SCM device identifiers 302 and SCM device profiles 304.

In this example, SCM device identifiers 302 include SCM device identifiers 0, 1, 2, and 3. However, it should be noted that SCM device identifiers 302 may include any number or type of SCM device identifiers corresponding to any number of SCM devices. SCM device profiles 304 include Profile A, Profile B, Profile C, and Profile D. However, it should be noted that SCM device profiles 304 may include any number or type of SCM device profiles.

In this example, SCM device Profile A is an SCM implementation only for SCM devices 0-3. SCM device Profile B is an SCM and DRaaS implementation for SCM devices 0-3. SCM device Profile C is an SCM and NAS implementation for SCM devices 0-3. SCM device Profile D is an SCM, DRaaS, and NAS implementation for SCM devices 0-3. However, it should be noted that any type of storage and any combination of storage types may be included in a given SCM device profile for the SCM devices.

Figure 4:
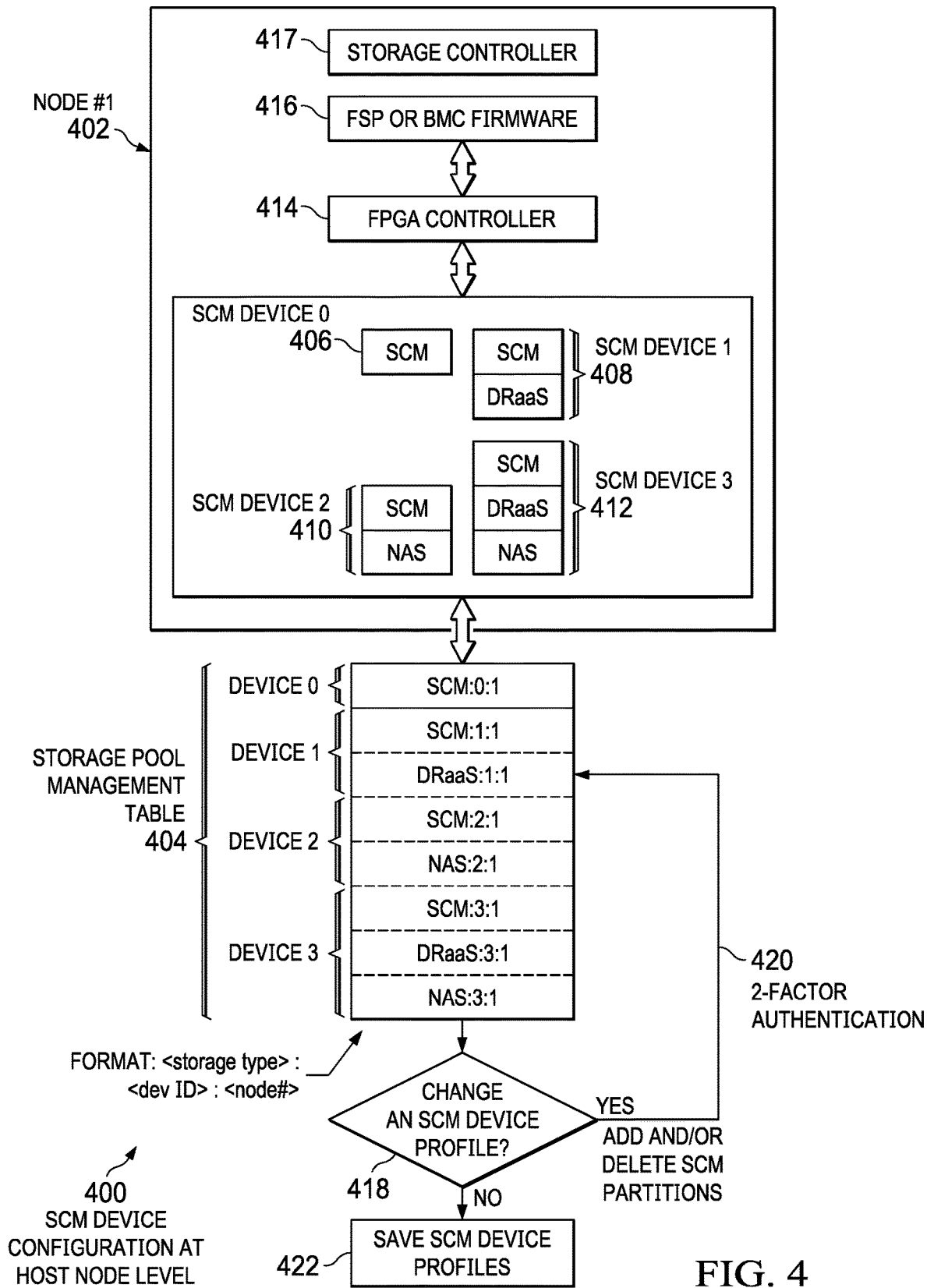
FIG. 4 is a diagram illustrating an example of SCM device configuration at host node level in accordance with an illustrative embodiment.

With reference now to FIG. 4, a diagram illustrating an example of SCM device configuration at host node level is depicted in accordance with an illustrative embodiment. SCM device configuration at host node level 400 may be implemented in a computer, such as, for example, server 104 in FIG. 1 or data processing system 200 in FIG. 2.

In this example, SCM device configuration at host node level 400 includes host node #1 402 and storage pool management table 404. Host node #1 402 may be, for example, client 110 in FIG. 1. Host node #1 402 includes SCM device 0 406, SCM device 1 408, SCM device 2 410, SCM device 3 412, FPGA controller 414, and FSP or BMC firmware 416.

FPGA controller 414, FSP or BMC firmware 416, and storage controller 417 configure SCM device 0 406 with an SCM partition, SCM device 1 408 with an SCM partition and a DRaaS partition, SCM device 2 410 with an SCM partition and an NAS partition, and SCM device 3 412 with an SCM partition, a DRaaS partition, and an NAS partition based on information received from an SCM device configuration manager, such as, for example, SCM device configuration manager 218 in FIG. 2. Storage pool management table 404 reflects the configuration of each of SCM device 0 406, SCM device 1 408, SCM device 2 410, and SCM device 3 412 using the format of storage type, SCM device identifier, and host node number, respectively.

At 418, the SCM device configuration manager makes a determination as to whether a change to an SCM profile of an SCM device needs to be made based on at least one of received monitoring data regarding utilization of SCM device 0 406, SCM device 1 408, SCM device 2 410, and SCM device 3 412 by an application workload of a customer, received future customer utilization trajectory of the SCM devices from artificial intelligence models, or real time customer inputs to change SCM device profiles. At 420, if the SCM device configuration manager determines that a change to an SCM profile does need to be made, then the SCM device configuration manager requests 2-factor authentication from a user. Upon successful 2-factor authentication, the SCM device configuration manager instructs FPGA controller 414 FSP or BMC firmware 416, and storage controller 417 to reconfigure the SCM profile of the SCM device by adding and/or deleting SCM device storage type partitions and then saves the SCM device profiles. At 422, if the SCM device configuration manager determines that a change to an SCM profile does not need to be made, then the SCM device configuration manager saves the SCM device profiles.

Figure 5:
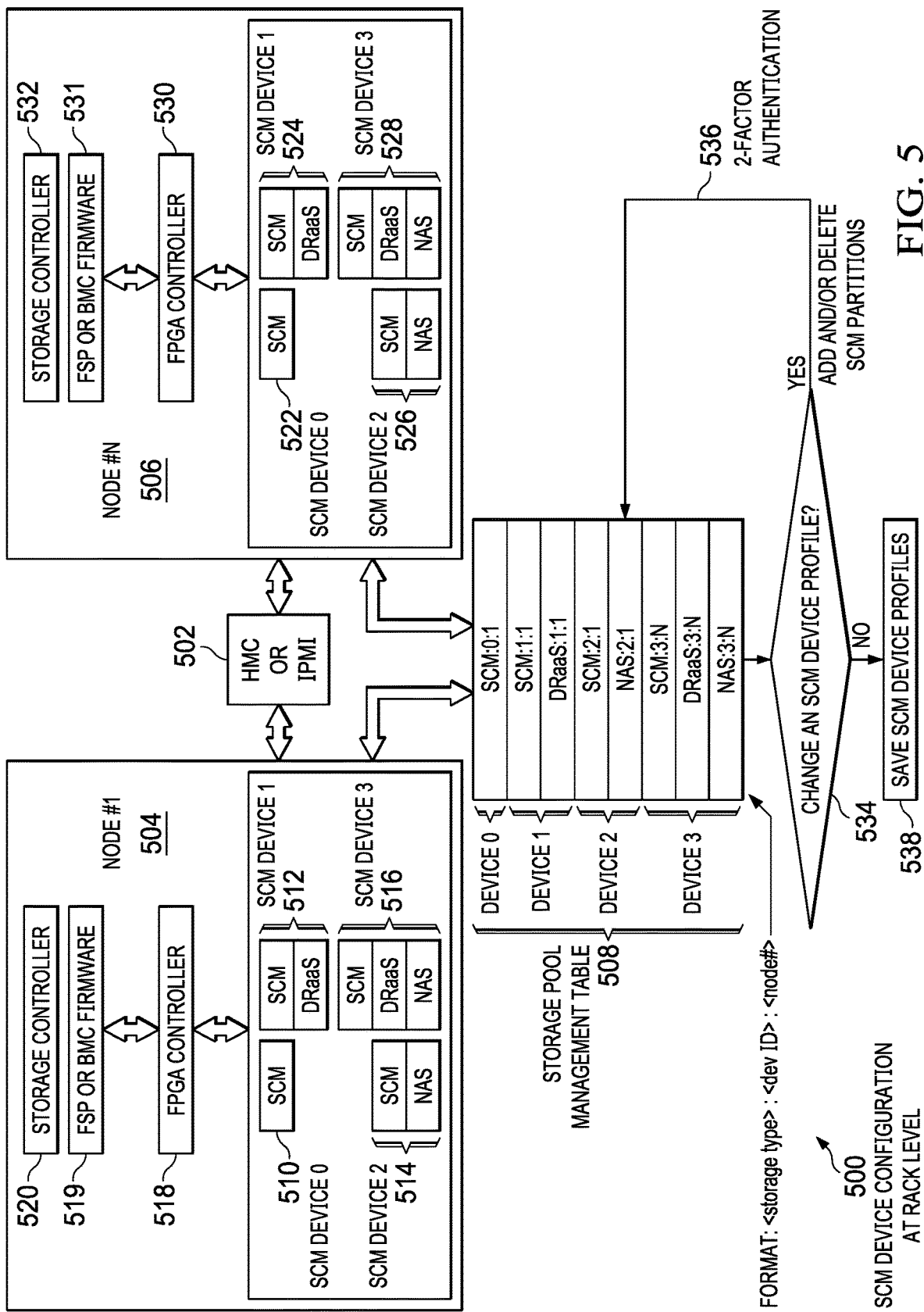
FIG. 5 is a diagram illustrating an example of SCM device configuration at rack level in accordance with an illustrative embodiment.

With reference now to FIG. 5, a diagram illustrating an example of SCM device configuration at rack level is depicted in accordance with an illustrative embodiment. SCM device configuration at rack level 500 is implemented in HMC or IPMI 502, such as, for example, server 104 in FIG. 1 or data processing system 200 in FIG. 2.

In this example, SCM device configuration at rack level 500 includes host node #1 504, host node #N 506, and storage pool management table 508. Host node #1 504 and host node #N 506 may be, for example, client 110 and client 112 in FIG. 1. However, it should be noted that host node #1 504 to host node #N 506 may include any number of host nodes in a rack of host nodes. Host node #1 504 includes SCM device 0 510, SCM device 1 512, SCM device 2 514, SCM device 3 516, FPGA controller 518, FSP or BMC firmware 519, and storage controller 520. Host node #N 506 includes SCM device 0 522, SCM device 1 524, SCM device 2 526, SCM device 3 528, FPGA controller 530, FSP or BMC firmware 531, and storage controller 532.

FPGA controller 518, FSP or BMC firmware 519, and storage controller 520 configure SCM device 0 510 with an SCM partition, SCM device 1 512 with an SCM partition and a DRaaS partition, SCM device 2 514 with an SCM partition and an NAS partition, and SCM device 3 516 with an SCM partition, a DRaaS partition, and an NAS partition based on information received from HMC or IPMI 502. FPGA controller 530, FSP or BMC firmware 531, and storage controller 532 configure SCM device 0 522 with an SCM partition, SCM device 1 524 with an SCM partition and a DRaaS partition, SCM device 2 526 with an SCM partition and an NAS partition, and SCM device 3 528 with an SCM partition, a DRaaS partition, and an NAS partition based on information received from HMC or IPMI 502. Storage pool management table 506 reflects the configuration of SCM devices 0-3 on host node #1 504 and host node #N 506 using the format of storage type, SCM device identifier, and host node number, respectively.

At 534, HMC or IPMI 502 makes a determination as to whether a change to an SCM profile of an SCM device needs to be made based on at least one of received monitoring data regarding utilization of SCM device 0 510, SCM device 1 512, SCM device 2 514, SCM device 3 516, SCM device 0 522, SCM device 1 524, SCM device 2 526, and SCM device 3 528 by application workloads of customers running on host node #1 504 and host node #N 506, received future customer utilization trajectories of the SCM devices from artificial intelligence models, or real time customer inputs to change SCM device profiles. At 536, if HMC or IPMI 502 determines that a change to an SCM profile does need to be made, then HMC or IPMI 502 requests 2-factor authentication from a user. Upon successful 2-factor authentication, HMC or IPMI 502 instructs FPGA controller 518, FSP or BMC firmware 519, and storage controller 520 or FPGA controller 530, FSP or BMC firmware 531, and storage controller 532 to reconfigure an SCM profile of an SCM device by adding and/or deleting SCM device storage type partitions and then saves the SCM device profiles. At 538, if HMC or IPMI 502 determines that a change to an SCM profile does not need to be made, then the HMC or IPMI 502 saves the SCM device profiles.

Figure 6:
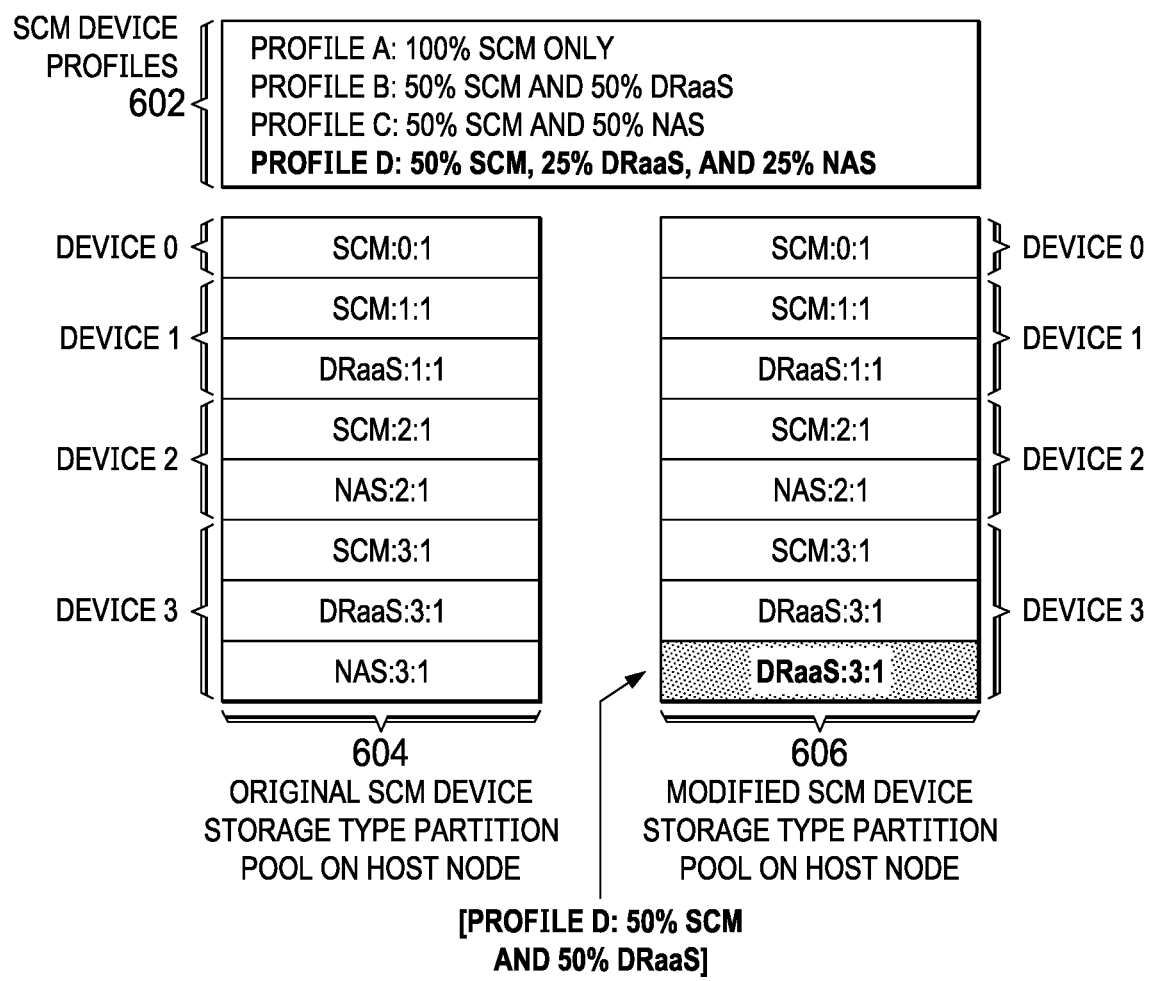
FIG. 6 is a diagram illustrating a specific example of SCM device storage type partition modification in accordance with an illustrative embodiment.

With reference now to FIG. 6, a diagram illustrating a specific example of SCM device storage type partition pool modification is depicted in accordance with an illustrative embodiment. SCM device storage type partition pool modification 600 may be implemented in a computer, such as, for example, server 104 in FIG. 1 or data processing system 200 in FIG. 2. For example, SCM device storage type partition pool modification 600 may be implemented in SCM device configuration manager 218 in FIG. 2. In this specific illustrative example, SCM device storage type partition pool modification 600 includes SCM device profiles 602, original SCM device storage type partition pool on host node 604, and modified SCM device storage type partition pool on host node 606.

A system administrator configures a host node, such as, for example, host node #1 402 in FIG. 4, which includes 4 SCM devices 0-3, using SCM device profiles 602 (i.e., SCM device Profiles A, B, C, and D), such as SCM device profiles 304 in FIG. 3. Alternatively, the SCM device configuration manager can automatically configure the 4 SCM devices on the host node using SCM device Profiles A, B, C, and D. The 4 SCM devices may be, for example, SCM device 0 406, SCM device 1 408, SCM device 2 410, and SCM device 3 412 in FIG. 4.

In this specific example, the system administrator, or alternatively the SCM device configuration manager, configures SCM device 0 using Profile A, which is a 100% SCM implementation, configures SCM device 1 using Profile B, which is a 50% SCM and 50% DRaaS implementation, configures SCM device 2 using Profile C, which is a 50% SCM and 50% NAS implementation, and configures SCM device 3 using Profile D, which is a 50% SCM, 25% DRaaS, and 25% NAS implementation to form original SCM device storage type partition pool on host node 604. After configuring the 4 SCM devices on the host node, the system administrator, or alternatively the SCM device configuration manager, starts running an application workload of a customer on the host node.

The SCM device configuration manager continuously, or on a predetermined time interval basis, monitors the application workload and SCM device utilization across all SCM device storage type partitions (i.e., utilization of each SCM, DRaaS, and NAS partition in SCM devices 0, 1, 2, and 3). After expiration of a defined time period (e.g., a defined number of minutes, hours, days, weeks, or the like), the SCM device configuration manager determines, based on the monitoring, that a multitude of critical customer data is periodically inundating the SCM partition of SCM device 3 and all of that critical customer data is being backed-up in the DRaaS partition of SCM device 3. The SCM device configuration manager also determines that the DRaaS partition of SCM device 3 is running out of storage space (e.g., only 2-3% storage space remaining).

The SCM device configuration manager utilizes artificial intelligence models (i.e., prescriptive analytics, which includes descriptive and predictive analytics) to determine an optimal SCM device profile change corresponding to the current situation (i.e., lack of DRaaS partition storage space in SCM device 3). In this specific example, the SCM device configuration manager determines that the NAS partition of SCM device 3 has a small static customer data footprint and that this static customer data can be moved to the NAS partition of SCM device 2. It should be noted that Profile C corresponding to SCM device 2 does not require any changes as data movement from the NAS partition of SCM device 3 to the NAS partition of SCM device 2 can be performed offline. As a result, the SCM device configuration manager determines that deletion of the NAS partition of SCM device 3 and reformatting that partition as another DRaaS partition for SCM device 3 is an optimal solution.

The SCM device configuration manager notifies a user (e.g., the customer, system administrator, or the like) of the determined changes to Profile D corresponding to SCM device 3 and requests 2-factor authentication from the user to implement the change to Profile D. Upon successful 2-factor authentication, the SCM device configuration manager broadcasts a message in the host node to pause any data operations (e.g., writes, reads, or the like) to SCM device 3 and implements the SCM partition changes (i.e., dynamically moves the static customer data from the NAS partition of SCM device 3 to the NAS partition of SCM device 2, deletes the NAS partition of SCM device 3, and reformats that partition as a second DRaaS partition for SCM device 3) to form modified SCM device storage type partition pool on host node 606. Thus, Profile D corresponding to SCM device 3 is now a 50% SCM and 50% DRaaS implementation.

Also, the SCM device configuration manager instructs storage controller software to readjust SCM partitions in the SCM storage type partition pool. It should be noted that the SCM device configuration manager can perform SCM device profile changes during a maintenance period of the host node outside of operational hours. Upon successful implementation of the changes to Profile D corresponding to SCM device 3, the SCM device configuration manager broadcasts another message in the host node to restart data operations to SCM device 3.

Figure 7:
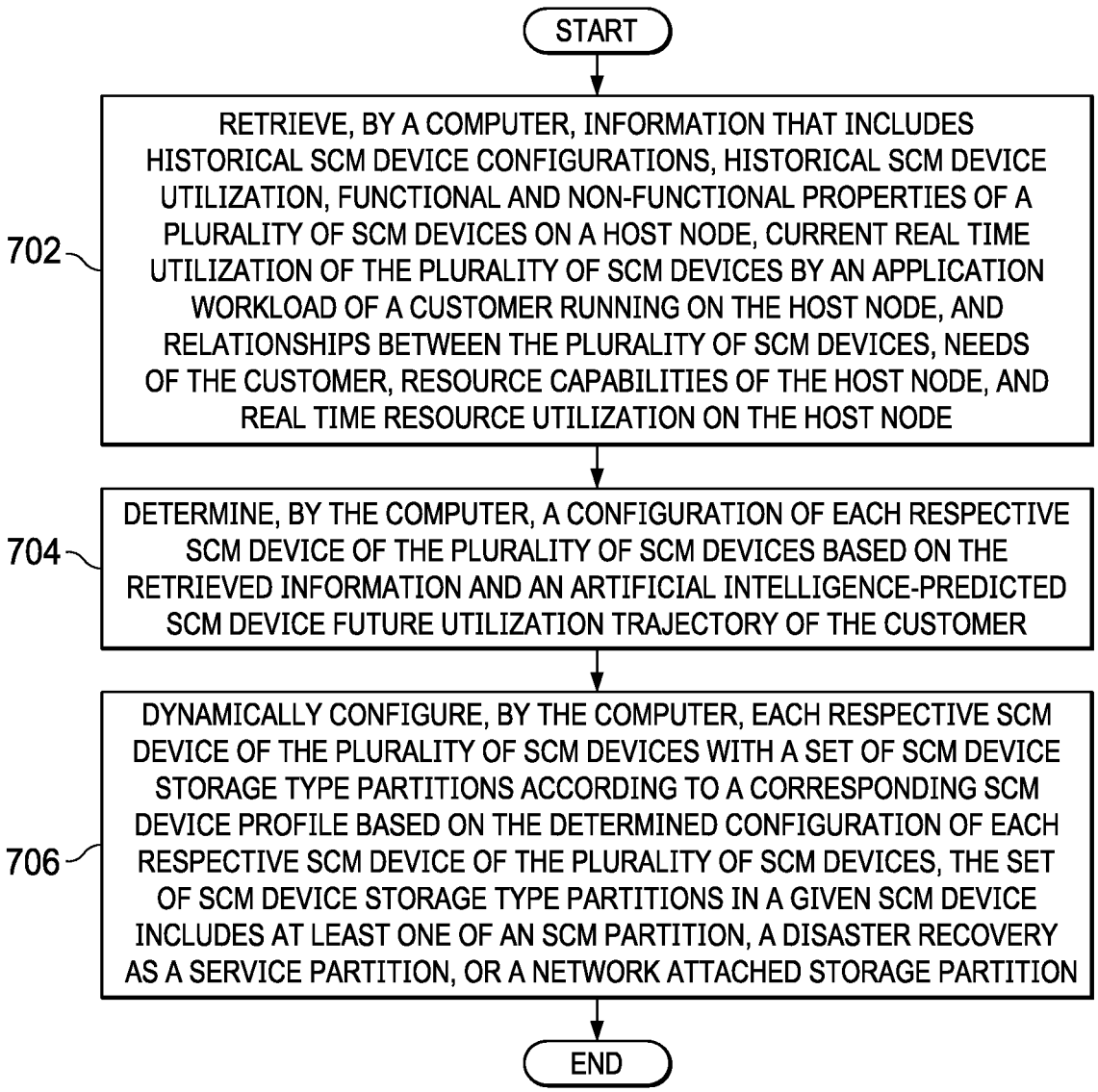
FIG. 7 is a flowchart illustrating a process for dynamically configuring SCM devices in accordance with an illustrative embodiment.

With reference now to FIG. 7, a flowchart illustrating a process for dynamically configuring SCM devices is shown in accordance with an illustrative embodiment. The process shown in FIG. 7 may be implemented in a computer, such as, for example, server 104 in FIG. 1 or data processing system 200 in FIG. 2. For example, the process shown in FIG. 7 may be implemented in SCM device configuration manager 218 in FIG. 2.

The process begins when the computer retrieves information that includes historical SCM device configurations, historical SCM device utilization, functional and non-functional properties of a plurality of SCM devices on a host node, current real time utilization of the plurality of SCM devices by an application workload of a customer running on the host node, and relationships between the plurality of SCM devices, needs of the customer, resource capabilities of the host node, and real time resource utilization on the host node (step 702). The computer determines a configuration of each respective SCM device of the plurality of SCM devices based on the retrieved information and an artificial intelligence-predicted SCM device future utilization trajectory of the customer (step 704).

The computer dynamically configures each respective SCM device of the plurality of SCM devices with a set of SCM device storage type partitions according to a corresponding SCM device profile based on the determined configuration of each respective SCM device of the plurality of SCM devices (step 706). The set of SCM device storage type partitions in a given SCM device of the plurality of SCM devices includes at least one of an SCM partition, a DRaaS partition, or a NAS partition. Thereafter, the process terminates.

Figure 8A:
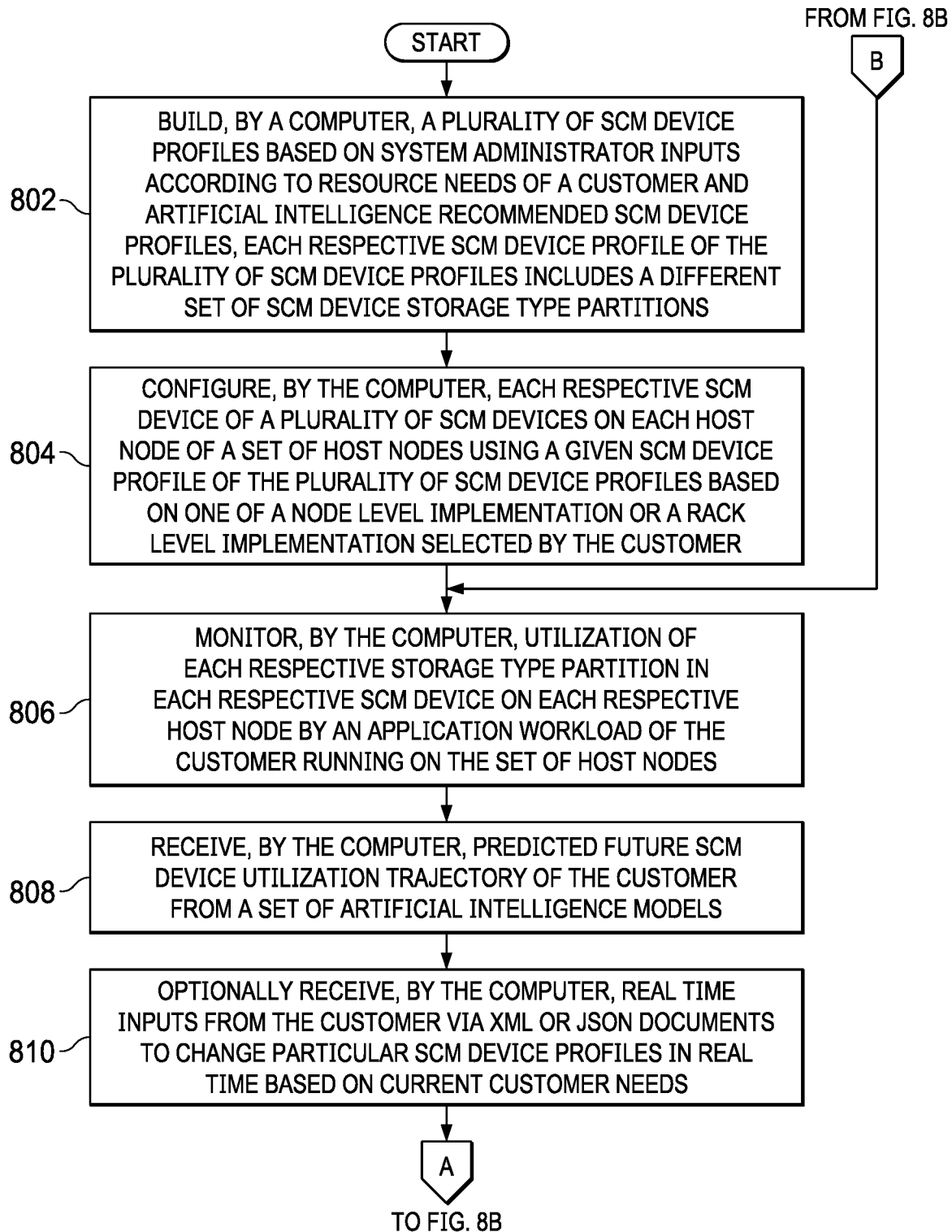
FIGS. 8A-8B are a flowchart illustrating a process for implementing SCM device profile changes in accordance with an illustrative embodiment.
Figure 8B:
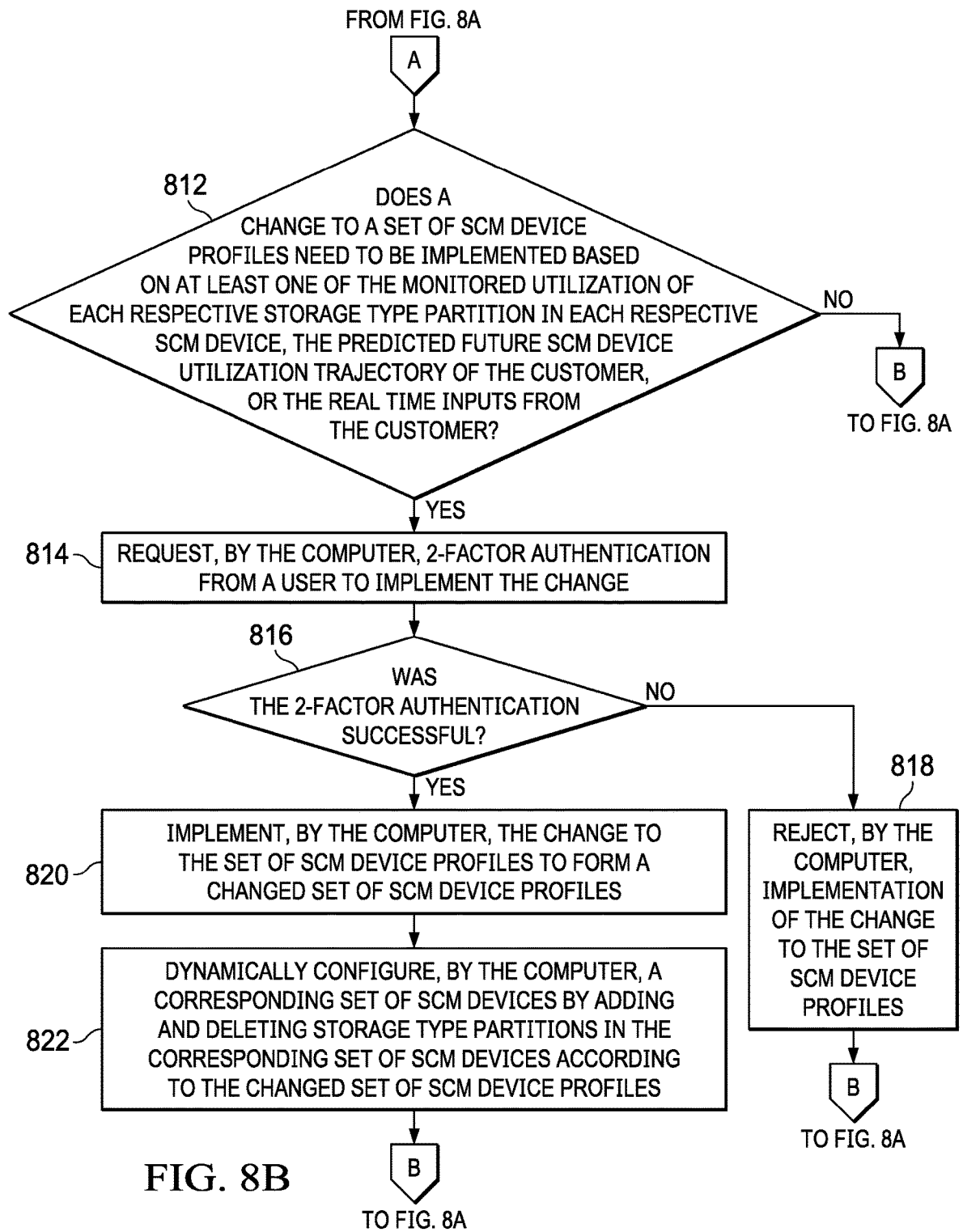

With reference now to FIGS. 8A-8B, a flowchart illustrating a process for implementing SCM device profile changes is shown in accordance with an illustrative embodiment. The process shown in FIGS. 8A-8B may be implemented in a computer, such as, for example, server 104 in FIG. 1 or data processing system 200 in FIG. 2. For example, the process shown in FIGS. 8A-8B may be implemented in SCM device configuration manager 218 in FIG. 2.

The process begins when the computer builds a plurality of SCM device profiles based on system administrator inputs according to resource needs of a customer and artificial intelligence recommended SCM device profiles (step 802). Each respective SCM device profile of the plurality of SCM device profiles includes a different set of SCM device storage type partitions. The computer configures each respective SCM device of a plurality of SCM devices on each host node of a set of host nodes using a given SCM device profile of the plurality of SCM device profiles based on one of a node level implementation or a rack level implementation selected by the customer (step 804).

The computer monitors utilization of each respective storage type partition in each respective SCM device on each respective host node by an application workload of the customer running on the set of host nodes (step 806). In addition, the computer periodically receives predicted future SCM device utilization trajectory of the customer from a set of artificial intelligence models (step 808). Further, the computer can optionally receive real time inputs from the customer via xml or json documents to change particular SCM device profiles in real time based on current customer needs (step 810).

The computer makes a determination as to whether a change to a set of SCM device profiles needs to be implemented based on at least one of the monitored utilization of each respective storage type partition in each respective SCM device, the predicted future SCM device utilization trajectory of the customer, or the real time inputs from the customer (step 812). If the computer determines that a change to a set of SCM device profiles does not need to be implemented, no output of step 812, then the process returns to step 806 where the computer continues to monitor the utilization of each respective storage type partition in each respective SCM device. If the computer determines that a change to a set of SCM device profiles does need to be implemented based on at least one of the monitored utilization of each respective storage type partition in each respective SCM device, the predicted future SCM device utilization trajectory of the customer, or the real time inputs from the customer, yes output of step 812, then the computer requests 2-factor authentication from a user to implement the change (step 814). The user is the customer, system administrator, or the like.

Subsequently, the computer makes a determination as to whether the 2-factor authentication was successful (step 816). If the computer determines that the 2-factor authentication was not successful, no output of step 816, then the computer rejects implementation of the change to the set of SCM device profiles (step 818). Thereafter, the process returns to step 806 where the computer continues to monitor the utilization of each respective storage type partition in each respective SCM device. If the computer determines that the 2-factor authentication was successful, yes output of step 816, then the computer implements the change to the set of SCM device profiles to form a changed set of SCM device profiles (step 820).

Afterward, the computer dynamically configures a corresponding set of SCM devices by adding and deleting storage type partitions in the corresponding set of SCM devices according to the changed set of SCM device profiles (step 822). Thereafter, the process returns to step 806 where the computer continues to monitor the utilization of each respective storage type partition in each respective SCM device.

Thus, illustrative embodiments of the present invention provide a computer-implemented method, computer system, and computer program product for dynamically configuring each of a plurality of storage class memory devices on a host node with a set of storage type partitions according to one of a plurality of storage class memory device profiles based on monitored utilization of each respective storage class memory device by an application workload of a customer running on the host node and predicted future storage class memory device utilization trajectory of the customer. The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for configuring storage class memory (SCM) devices, the computer-implemented method comprising:

retrieving, by a computer, information that includes historical SCM device configurations, historical SCM device utilization, functional and non-functional properties of a plurality of SCM devices on a set of host nodes, current real time utilization of the plurality of SCM devices by an application workload of a customer running on the set of host nodes, and relationships between the plurality of SCM devices, needs of the customer, resource capabilities of the set of host nodes, and real time resource utilization on the set of host nodes;

building, by the computer, a plurality of SCM device profiles based on system administrator inputs according to resource needs of a customer and artificial intelligence recommended SCM device profiles, wherein each respective SCM device profile of the plurality of SCM device profiles includes a different set of SCM device storage type partitions;

configuring, by the computer, each respective SCM device of the plurality of SCM devices on each respective host node of the set of host nodes using a given SCM device profile of the plurality of SCM device profiles, wherein the configuring is based on the retrieved information and an artificial intelligence-predicted SCM device future utilization trajectory of the customer;

monitoring, by the computer, utilization of each respective storage type partition in each respective SCM device on each respective host node of the set of host nodes by the application workload of the customer running on the set of host nodes;

receiving, by the computer, an updated predicted future SCM device utilization trajectory of the customer from a set of artificial intelligence models;

receiving, by the computer, real time inputs from the customer to change particular SCM device profiles in real time based on current customer needs;

determining, by the computer, whether a change to a set of SCM device profiles needs to be implemented based on at least one of monitored utilization of each respective storage type partition in each respective SCM device, the updated predicted future SCM device utilization trajectory of the customer, or the real time inputs from the customer;

responsive to the computer determining that the change to the set of SCM device profiles does need to be implemented, implementing, by the computer, the change to the set of SCM device profiles to form a changed set of SCM device profiles; and dynamically reconfiguring, by the computer, one or more of the plurality of SCM devices by adding and deleting storage type partitions in the one or more of the plurality of SCM devices according to the changed set of SCM device profiles.

2. The computer-implemented method of claim 1 further comprising:

wherein the configuring, by the computer, each respective SCM device of the plurality of SCM devices on each respective host node of the set of host nodes using the given SCM device profile of the plurality of SCM device profiles is further based on one of a node level implementation or a rack level implementation selected by the customer.

3. The computer-implemented method of claim 1 further comprising:
wherein the receiving, by the computer, the real time inputs from the customer to change particular SCM device profiles in real time based on current customer needs comprises receiving the real time inputs via one of xml or json documents.

4. The computer-implemented method of claim 1 further comprising:
responsive to the computer determining that the change to the set of SCM device profiles does need to be implemented, requesting, by the computer, 2-factor authentication from the customer to implement the change to the set of SCM device profiles; and
determining, by the computer, whether the 2-factor authentication was successful.

5. The computer-implemented method of claim 4 further comprising:
responsive to the computer determining that the 2-factor authentication was successful, implementing, by the computer, the change to the set of SCM device profiles to form the changed set of SCM device profiles.

6. The computer-implemented method of claim 1, wherein a set of SCM device storage type partitions in a given SCM device of the plurality of SCM devices includes at least one of an SCM partition, a disaster recovery as a service partition, and a network attached storage partition.

7. The computer-implemented method of claim 1, wherein the computer utilizes prescriptive analytics by combining an AutoRegressive Integrated Moving Average (ARIMA) model with a decision optimizer component over a time windowing pattern to dynamically optimize addition and deletion of SCM device storage type partitions based on inputs to the decision optimizer component from the ARIMA model.

8. A computer system for configuring storage class memory (SCM) devices, the computer system comprising:
a bus system;
a storage device connected to the bus system, wherein the storage device stores program instructions; and
a processor connected to the bus system, wherein the processor executes the program instructions to:
retrieve information that includes historical SCM device configurations, historical SCM device utilization, functional and non-functional properties of a plurality of SCM devices on a set of host nodes, current real time utilization of the plurality of SCM devices by an application workload of a customer running on the set of host nodes, and relationships between the plurality of SCM devices, needs of the customer, resource capabilities of the set of host nodes, and real time resource utilization on the set of host nodes;
build a plurality of SCM device profiles based on system administrator inputs according to resource needs of a customer and artificial intelligence recommended SCM device profiles, wherein each respective SCM device profile of the plurality of SCM device profiles includes a different set of SCM device storage type partitions;
configure each respective SCM device of the plurality of SCM devices on each respective host node of the set of host nodes using a given SCM device profile of the plurality of SCM device profiles, wherein the configuring is based on the retrieved information and an artificial intelligence-predicted SCM device future utilization trajectory of the customer;
monitor utilization of each respective storage type partition in each respective SCM device on each respective host node of the set of host nodes by the application workload of the customer running on the set of host nodes;
receive an updated predicted future SCM device utilization trajectory of the customer from a set of artificial intelligence models;
receive real time inputs from the customer to change particular SCM device profiles in real time based on current customer needs;
determine whether a change to a set of SCM device profiles needs to be implemented based on at least one of monitored utilization of each respective storage type partition in each respective SCM device, the updated predicted future SCM device utilization trajectory of the customer, or the real time inputs from the customer;
responsive to determining that the change to the set of SCM device profiles does need to be implemented, implement the change to the set of SCM device profiles to form a changed set of SCM device profiles; and
dynamically reconfigure one or more of the plurality of SCM devices by adding and deleting storage type partitions in the one or more of the plurality of SCM devices according to the changed set of SCM device profiles.

9. A computer program product for configuring storage class memory (SCM) devices, the computer program product comprising a computer-readable storage medium having program instructions embodied therewith, the program instructions executable by a computer to cause the computer to perform a method of:
retrieving, by the computer, information that includes historical SCM device configurations, historical SCM device utilization, functional and non-functional properties of a plurality of SCM devices on a set of host nodes, current real time utilization of the plurality of SCM devices by an application workload of a customer running on the set of host nodes, and relationships between the plurality of SCM devices, needs of the customer, resource capabilities of the set of host nodes, and real time resource utilization on the set of host nodes;
building, by a computer, a plurality of SCM device profiles based on system administrator inputs according to resource needs of a customer and artificial intelligence recommended SCM device profiles, wherein each respective SCM device profile of the plurality of SCM device profiles includes a different set of SCM device storage type partitions;
configuring, by the computer, each respective SCM device of the plurality of SCM devices on each respective host node of the set of host nodes using a given SCM device profile of the plurality of SCM device profiles, wherein the configuring is based on the retrieved information and an artificial intelligence-predicted SCM device future utilization trajectory of the customer;
monitoring, by the computer, utilization of each respective storage type partition in each respective SCM device on each respective host node of the set of host nodes by the application workload of the customer running on the set of host nodes;

receiving, by the computer, an updated predicted future SCM device utilization trajectory of the customer from a set of artificial intelligence models;

receiving, by the computer, real time inputs from the customer to change particular SCM device profiles in real time based on current customer needs;

determining, by the computer, whether a change to a set of SCM device profiles needs to be implemented based on at least one of monitored utilization of each respective storage type partition in each respective SCM device, the updated predicted future SCM device utilization trajectory of the customer, or the real time inputs from the customer;

responsive to the computer determining that the change to the set of SCM device profiles does need to be implemented, implementing, by the computer, the change to the set of SCM device profiles to form a changed set of SCM device profiles; and dynamically reconfiguring, by the computer, one or more of the plurality of SCM devices by adding and deleting storage type partitions in the one or more of the plurality of SCM devices according to the changed set of SCM device profiles.

10. The computer program product of claim 9 further comprising:

wherein the configuring, by the computer, each respective SCM device of the plurality of SCM devices on each respective host node of the set of host nodes using the given SCM device profile of the plurality of SCM device profiles is further based on one of a node level implementation or a rack level implementation selected by the customer.

11. The computer program product of claim 9 further comprising:

wherein the receiving, by the computer, the real time inputs from the customer to change particular SCM device profiles in real time based on current customer needs comprises receiving the real time inputs via one of xml or json documents.

12. The computer program product of claim 11 further comprising:

responsive to the computer determining that the change to the set of SCM device profiles does need to be implemented, requesting, by the computer, 2-factor authentication from the customer to implement the change to the set of SCM device profiles; and determining, by the computer, whether the 2-factor authentication was successful.

13. The computer program product of claim 12 further comprising:

responsive to the computer determining that the 2-factor authentication was successful, implementing, by the computer, the change to the set of SCM device profiles to form the changed set of SCM device profiles.

* * * * *